(12) United States Patent
Richards et al.

(10) Patent No.: US 10,678,330 B1
(45) Date of Patent: *Jun. 9, 2020

(54) BACKLIGHT MODULATION FOR LIQUID CRYSTAL DISPLAY WITH EYETRACKING FOR VIRTUAL REALITY

(71) Applicant: Facebook Technologies, LLC, Menlo Park, CA (US)

(72) Inventors: Evan M. Richards, Fremont, CA (US); Jianru Shi, Union City, CA (US); Fenglin Peng, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,612

(22) Filed: Aug. 15, 2019

Related U.S. Application Data (63) Continuation of application No. 15/492,275, filed on Apr. 20, 2017, now Pat. No. 10,437,326.
(Continued)

(51) Int. Cl.
*G06F 3/01* (2006.01)
*G09G 3/34* (2006.01)
(Continued)

(52) U.S. Cl.
CPC .......... *G06F 3/013* (2013.01); *G02B 27/0172* (2013.01); *G06F 3/011* (2013.01);
(Continued)

(58) Field of Classification Search
CPC .... G09G 3/3406; G09G 3/342; G09G 3/3413; G09G 3/003; G09G 2310/08; G09G 2310/0626; G09G 2320/064; G09G 2320/0646; G09G 2320/0653; G09G 2354/00; G06F 3/013; G06F 3/011; G06F 3/012; G02B 27/0172; G02B 2027/0138; G02B 2027/014; G02B 2027/0187; G02B 2027/017; G06T 19/006; G06T 2207/30201; G06T 7/246; G06T 7/292; A63F 2300/8082; A63F 13/213; G06K 9/00228; G06K 9/00255; G06K 9/00275; G06K 9/00288; G06K 9/00604;
(Continued)

(56) References Cited

U.S. PATENT DOCUMENTS

9,401,128 B1 7/2016 Jepsen
2007/0132709 A1 6/2007 Kawaguchi
(Continued)

*Primary Examiner* — Darlene M Ritchie
(74) *Attorney, Agent, or Firm* — Fenwick & West LLP (57) ABSTRACT

A head mounted display system includes a display device and an eyetracking device. The display device includes a liquid crystal (LC) panel comprising a plurality of rows of pixels, a back light unit (BLU), and a data driver. The BLU emits light during an illumination period of a frame period from an illumination start time and does not emit light for a remaining portion of the frame period. The eyetracking device determines an eye gaze area of a user in a pixel area of the display device. The illumination start time varies based on a location of the eye gaze area of the user. Liquid crystal material in a row of pixels of the LC panel outside the eye gaze area of the user transitions during the illumination period.

20 Claims, 6 Drawing Sheets

Related U.S. Application Data

(60) Provisional application No. 62/325,947, filed on Apr. 21, 2016.

(51) Int. Cl.
*G09G 5/18* (2006.01)
*G02B 27/01* (2006.01)

(52) U.S. Cl.
CPC ... *G09G 3/3406* (2013.01); *G02B 2027/0138* (2013.01); *G02B 2027/0187* (2013.01); *G09G 5/18* (2013.01)

(58) Field of Classification Search
CPC .......... G06K 9/00248; G06K 9/00268; G06K 9/00281; G06K 9/00523; H04N 13/344; H04N 13/366; H04N 13/371; H04N 13/383
See application file for complete search history.

(56) References Cited

U.S. PATENT DOCUMENTS

| | | |
|---|---|---|
| 2007/0291227 A1 | 12/2007 | Yang et al. |
| 2008/0224986 A1 | 9/2008 | Huang et al. |
| 2011/0033130 A1 | 2/2011 | Poon et al. |
| 2011/0193947 A1 | 8/2011 | Chen |
| 2012/0288139 A1 | 11/2012 | Singhar |
| 2014/0267420 A1 | 9/2014 | Schowengerdt et al. |
| 2014/0313120 A1* | 10/2014 | Kamhi ............... G06K 9/00604 345/156 |
| 2015/0077321 A1* | 3/2015 | Varekamp ............ G09G 3/3406 345/102 |
| 2016/0293114 A1 | 10/2016 | Hayashi et al. |
| 2017/0131551 A1 | 5/2017 | Robbins et al. |
| 2018/0260024 A1 | 9/2018 | Maltz |

* cited by examiner

BACKLIGHT MODULATION FOR LIQUID CRYSTAL DISPLAY WITH EYETRACKING FOR VIRTUAL REALITY

CROSS-REFERENCE TO RELATED APPLICATION

This application is a continuation of U.S. patent application Ser. No. 15/492,275, filed Apr. 20, 2017, which claims the priority benefit of U.S. Provisional Patent Application No. 62/325,947 filed on Apr. 21, 2016, each of which is incorporated herein by reference for all purposes as if fully set forth herein.

BACKGROUND

The present disclosure generally relates to enhancing a Liquid Crystal Display (LCD) for use in a virtual reality, mixed reality, or augmented reality system.

SUMMARY

A head mounted display system includes a display device and an eyetracking device. The display device includes a liquid crystal (LC) panel including a plurality of rows of pixels, a back light unit (BLU), a data driver, and a controller. The controller applies a first control signal to the data driver to write data to the LC panel and a second control signal to the BLU to emit light during an illumination period of a frame period from an illumination start time and to not emit light for a remaining portion of the frame period. The eyetracking device determines an eye gaze area of a user in a pixel area of the display device. The illumination start time varies based on a location of the eye gaze area.

Also described is a method of displaying an image by a display device. The method includes writing, by a data driver, data to a plurality of rows of pixels of a liquid crystal (LC) panel, determining, by an eyetracking device, an eye gaze area of a user, and emitting, by a back light, light at an illumination start time for an illumination period and not emitting light for a portion of the frame period, wherein the illumination start time is based on the eye gaze area of the user.

In one embodiment, the liquid crystal material in a row of pixels of the LC panel outside the eye gaze area of the user transitions during the illumination period. In an aspect, the eye gaze area of the user is in a top portion of the pixel area and the illumination start time occurs before an end of the frame period. In another aspect, the eye gaze area of the user is in a middle portion of the pixel area of the display device, and the illumination start time occurs before an end of the frame period and the illumination period extends into a subsequent frame period subsequent to the frame period. Responsive to the eye gaze area of the user moving below a previous eye gaze area of the user, the illumination start time shifts closer to an end of the frame period. Responsive to the eye gaze area of the user moving above a previous eye gaze area of the user, the illumination start time shifts closer to a start of the frame period. In an aspect, the eye gaze area of the user is in a bottom portion of the pixel area of the display device, and the illumination start time is at an end of the frame period or beginning of a subsequent frame period. The data driver may write data to a row of the pixels of the LC panel outside the eye gaze area in a subsequent frame period during at least a portion of the illumination period. The data driver may write data to the plurality of rows of pixels at a beginning portion of the frame period and the illumination start time occurs at or after an end of the beginning portion of the frame period.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

A VR system using an LCD includes an eye tracking apparatus to determine a user's gaze, which allows the system to modulate the illumination time period of the backlight unit (BLU). In a black duty insertion (BDI) mode, image data is loaded to the pixels of the LCD using regular rolling mode from top to bottom over the whole frame time and the BLU is illuminated for only a portion of the frame time (e.g., 20%), for example at the end of the frame time, to display the entire pixels of the display. BLU modulation allows for varying the BLU illumination time period such that the liquid crystals (LCs) corresponding to the pixels the user is currently looking at have completed their transition to their final state before the illumination actually begins. While some pixels of the LCD that is operated in the BDI mode will likely have either compromised states or display old image data, BLU modulation enables to confine such compromised pixels within the user's peripheral vision and thereby minimize any degradation of user experience.

Figure 1:
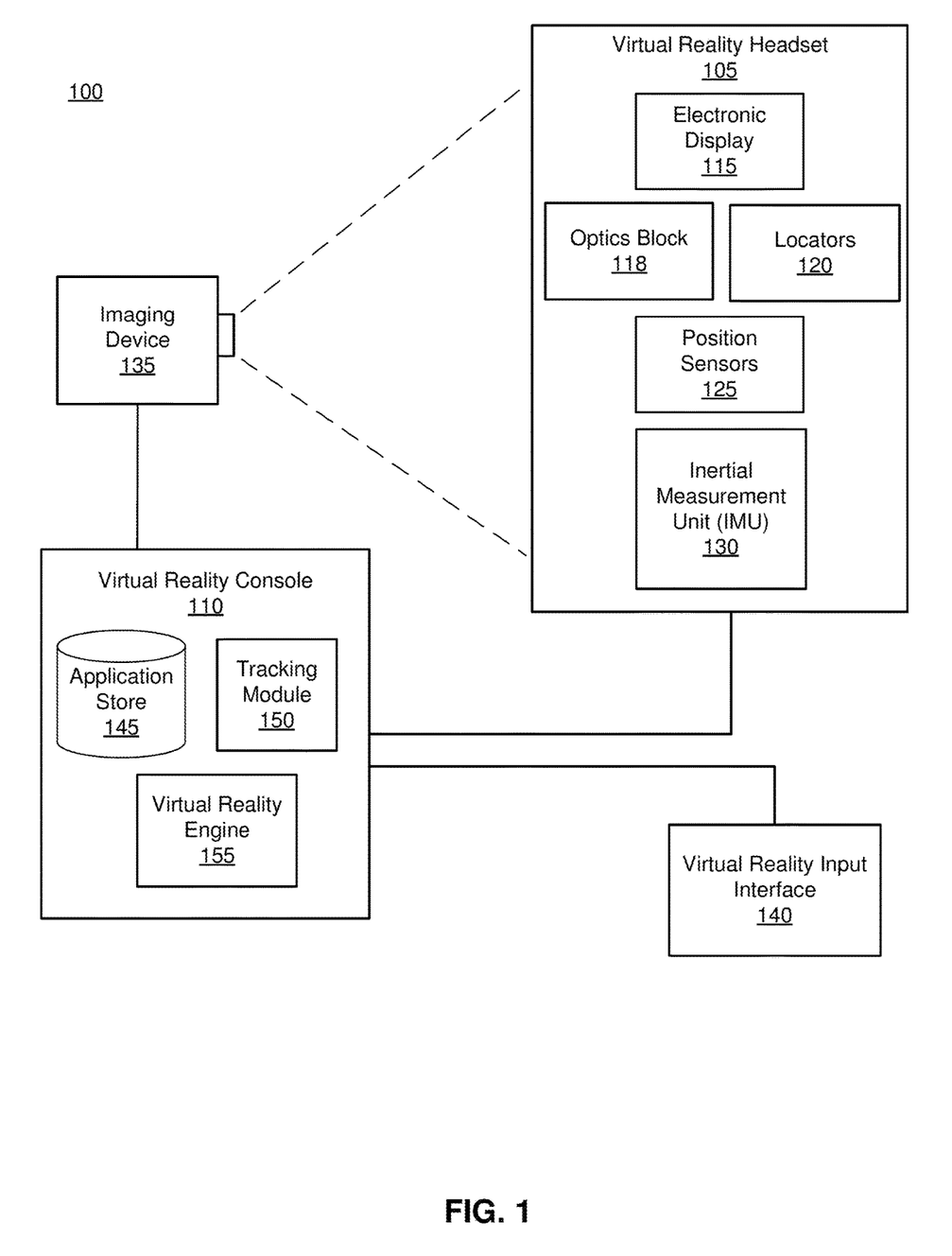
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., an electronic display for each eye of a user).

An electronic display 115 may be a liquid crystal display (LCD), an organic light emitting diode (OLED) display, an active-matrix organic light-emitting diode display (AMO-LED), a TOLED, some other display, or some combination thereof.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
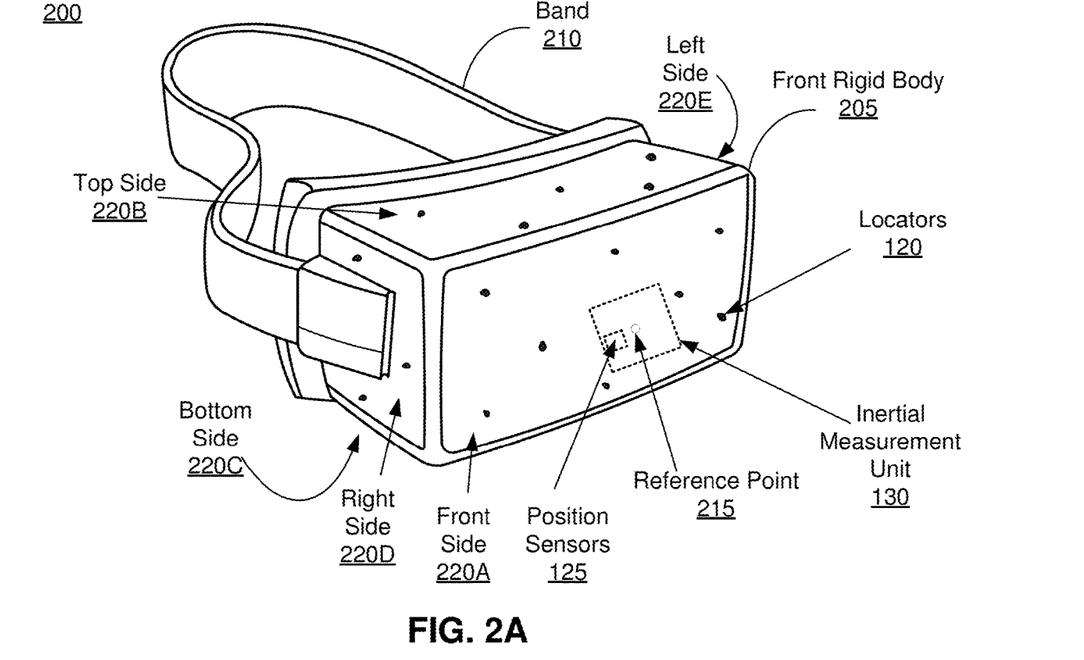
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes an electronic display 115, the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
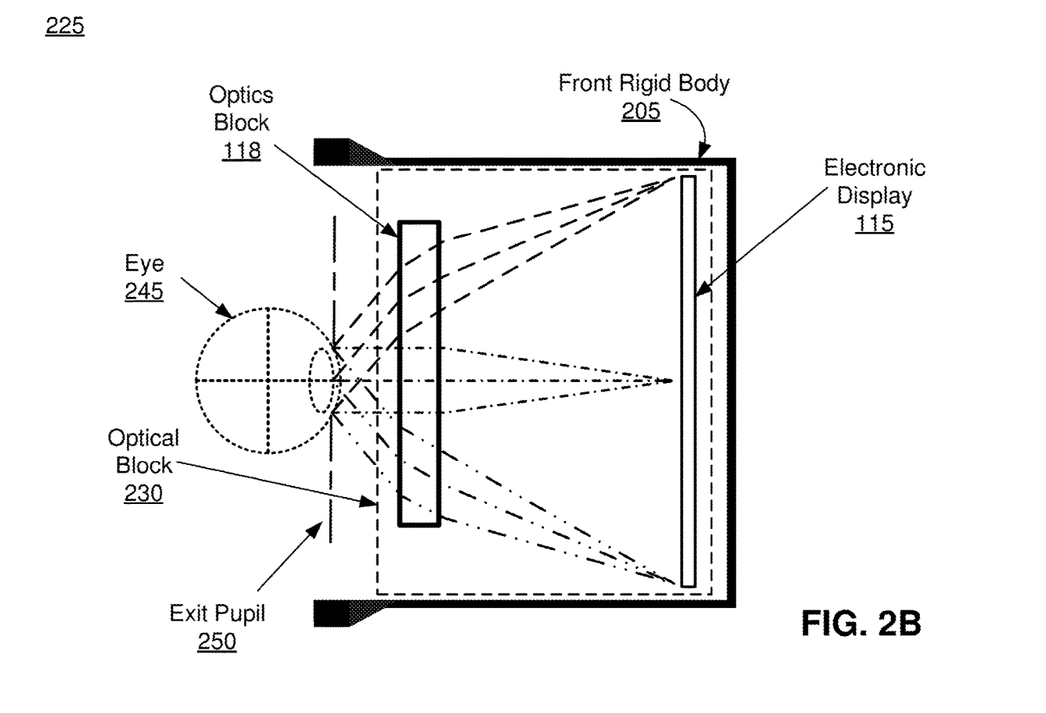
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display 115, and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Figure 3A:
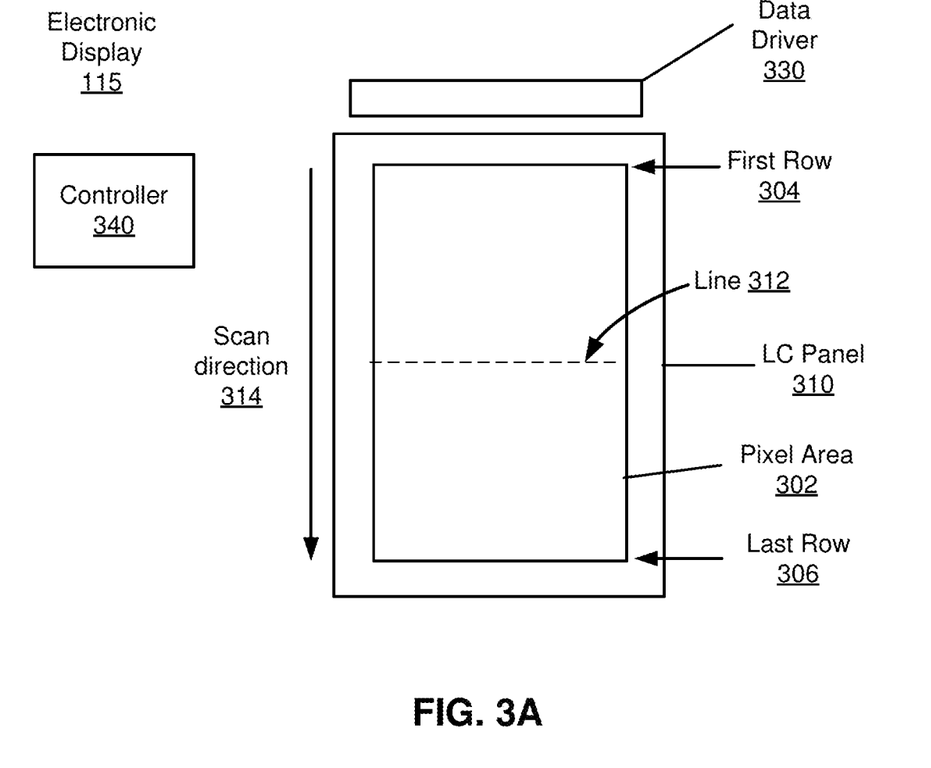
FIG. 3A is a top view of an example electronic display, in accordance with an embodiment.
Figure 3B:
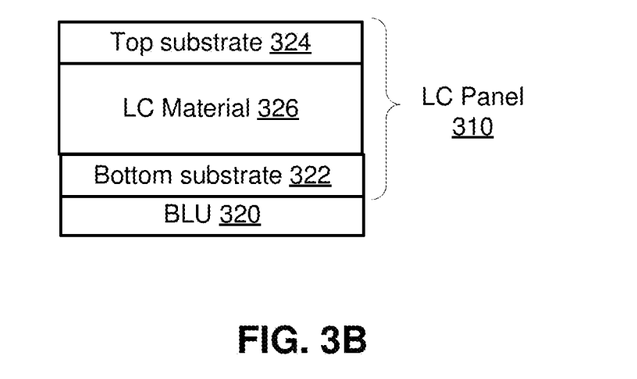
FIG. 3B is a cross section of an example electronic display, in accordance with an embodiment.

FIG. 3A is a top view and FIG. 3B is a cross section of an electronic display 115, in accordance with an embodiment. In one embodiment, the electronic display 115 is a LCD device including a LC panel 310, BLU 320, a data driver 330, and a controller 340. The LC panel 310 covers the BLU 320 and includes a pixel area 302 comprising a plurality of rows of pixels including a first row 304 and a last row 306 of pixels. A cross section of the pixel area 302 along line 312 is shown in FIG. 3B and shows the LC panel 310 covering the BLU 320.

The BLU 320 includes a light source (not shown) that is an electrical component that generates light. The BLU 320 is configured to emit light toward the LC panel 310. The light source may comprise a plurality of light emitting components (e.g., light emitting diodes (LEDs), light bulbs, or other components for emitting light). In one aspect, intensity of light from the light source is adjusted according to a backlight control signal from the controller 340. The backlight control signal is a signal indicative of intensity of light to be output for the light source. A light source may adjust its duty cycle of or an amount of current supplied to the light emitting component (e.g., LED), according to the backlight control signal. For example, the light source may be 'ON' for a portion of a frame time, and 'OFF' for another portion of the frame time, according to the backlight control signal. Example operations of the BLU 320 are further described in detail below with respect to FIGS. 4A to 4C. The BLU 320 projects light from the light source towards the LC panel 310. The BLU 320 may include a light guide plate and refractive and/or reflective components for projecting light towards the LC panel 310. The light guide plate may receive light with different colors from light sources, and may project combined light including a combination of the different colors towards the LC panel 310.

The LC panel 310 includes a bottom substrate 322, a top substrate 324, and LC material 326 between the bottom and top substrates 322 and 324. Although not shown in FIG. 3B, the bottom substrate 322 may include driver pixel circuitry and transparent pixel electrodes, and the top substrate 324 may include color filters, a black matrix, and transparent conductive electrodes. Also, spacers may be used to control the spacing between the top substrate and the bottom substrate, although not shown in FIG. 3B. The LC material 326 is placed between the top and bottom substrate 322 and 324.

The data driver 330 is coupled to the LC panel 310 and writes display data (e.g., data corresponding to an image) to pixels in the pixel area 302 of the LC panel 310. Although shown as a separate component, the data driver 330 may be included in the LC panel 310. The data driver 330 writes the display data in a scan direction 314 from a first row 304 to a last row 306 of pixels in the pixel area 302. The display data written to a pixel may be in the form of an analog voltage that may be applied across electrodes on the bottom and/or top substrate 322 and 324 of a pixel to change the orientation of LC material 326 in the LC panel 310. The change in orientation of the LC material 326 allows a portion of the light from the BLU 320 to reach a user's eye 245.

The controller 340 is a circuit component that receives an input image data and generates control signals for driving the data driver 330 and BLU 320. The input image data may correspond to an image or a frame of a video in a VR and/or AR application. The controller 340 instructs the data driver 330 to write data to the LC panel 310 to control an amount of light from the BLU 320 to the exit pupil 250 through the LC material 326. The controller 340 generates the backlight control signal for turning ON or OFF the BLU 320, as described in more detail for FIG. 4A. In other embodiments, the electronic display 115 includes different, more or fewer components than shown in FIGS. 3A and 3B. For example, the electronic display 115 may include a polarizer and a light diffusing component.

Black Duty Insertion Mode for LCDs in VR Headset

The electronic display 115 in a VR headset has certain requirements such as a short duty cycle to prevent image streaking and short illumination times to reduce latency. While the electronic display 115 could be a Liquid Crystal Display (LCD), LCDs are currently one or two orders of magnitude slower than active matrix OLED displays (AMO-LEDs). The switching time associated with the liquid crystal (LC), or the amount of time required for the LC to change state, may take several milliseconds (ms), making it difficult to achieve a short duty cycle with LCDs and limiting the speed of LCDs. In addition, conventional LCD has the backlight unit (BLU) always turned on and do not have short illumination times. To improve LCD performance in a VR headset, a shorter duty cycle and illumination time may be achieved by using an alternative operating mode for LCDs such as a BDI mode according to the embodiments herein.

In the BDI mode, the entire frame time is made available for image data scan out (and charging of the pixels of the LCD accordingly) and LC state change according to the image data. In one aspect, the data driver writes data to all of the pixels of the LCD before the BLU emits light. The BLU is typically turned on for a portion (e.g., 20%) of the frame time, for example during the last 20% of the frame. In this mode, the BLU may turn on while the image data for some of the pixels is still being scanned out for charging into the pixels or while the LC of some of the pixels is still undergoing transition according to the charged image data. The resulting image that is shown during the illumination portion of the BLU may include compromised pixels which have not completed the LC transition to the state indicated by the written image data, and old images of pixels from a previous frame which are being updated during the illumination portion of the BLU. By turning on the BLU during the final portion of the frame—as opposed to the beginning or middle portion of the frame—the number of compromised pixel may be reduced.

Figure 4A:
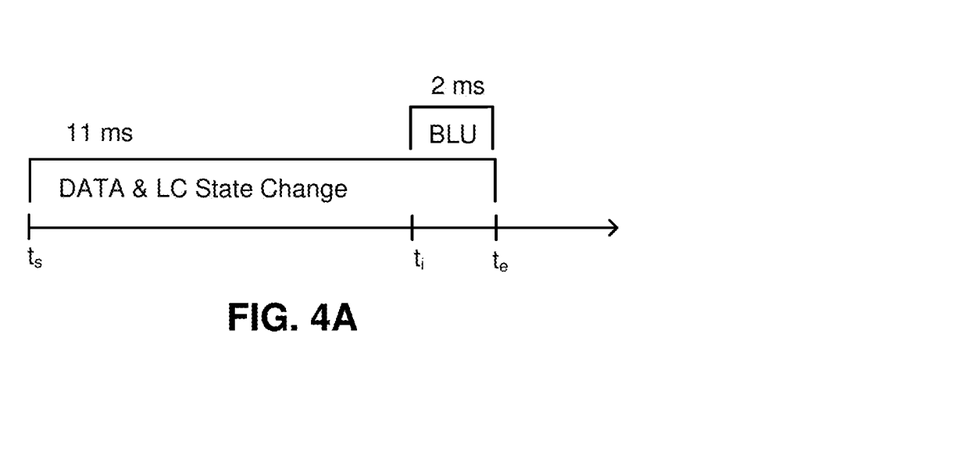
FIGS. 4A, 4B, and 4C are diagrams illustrating a frame cycle of an LCD in black duty insertion mode, in accordance with an embodiment.
Figure 4B:
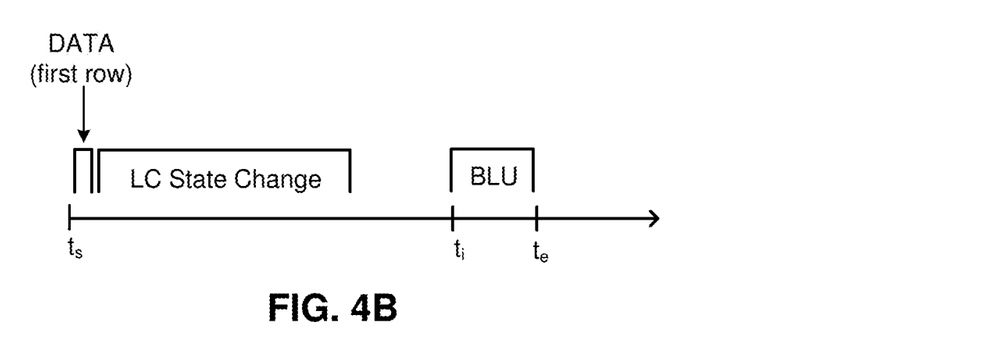
Figure 4C:
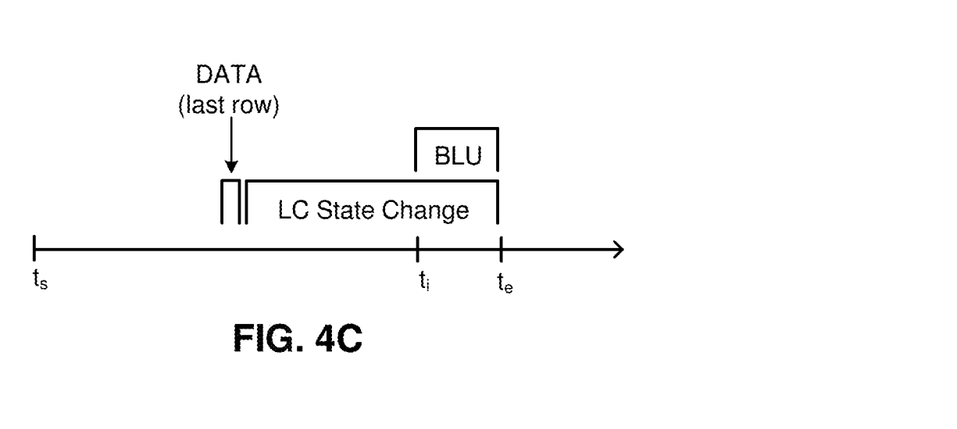

FIGS. 4A-4C show an example frame time for a 90 Hz LCD in BDI mode, according to one embodiment. In the example frame time shown in FIG. 4A, the allocated period for data scan out is represented from $t_s$ to $t_e$, where $t_s$ represents start of the frame and $t_e$ represents the end of the frame. The illumination of the BLU begins at ti irrespective of whether the pixel data of the whole frame is scanned out and their corresponding LCs have transitioned, and ends at the end of the frame, $t_e$. For an example frame time of 11 ms in the BDI mode, data scan out and LC state change are allocated the entire 11 ms and the illumination time of the BLU is set to the final 2 ms of the frame time. During the illumination portion of the BLU, pixels updated during a beginning portion of the frame time (e.g., the first 3 ms) displays data that is updated and correct; pixels updated during a middle portion of the frame time (e.g., from 3 ms to 9 ms) may be in a compromised state, and pixels updated during a last portion of the frame time (e.g., the last 2 ms) may display old images from a previous frame.

In an LCD running with the BDI mode where the pixels are updated from a top row to a bottom row, the bottom rows of the LCD may display compromised or old image data. For example, FIG. 4B shows the timing diagram corresponding to the first row of pixels of the LCD. As shown in FIG. 4B, image data for the first row is scanned out at the beginning of the frame time (i.e., closer to time $t_s$). The LCs corresponding to the first row of pixels begin changing their state as soon as the data scan out is complete and finish their transition earlier than the end of the allocated LC state change time budget (i.e., earlier than time $t_e$). FIG. 4C shows the timing diagram corresponding to the last row of pixels of the LCD. As shown in FIG. 4C, image data for the last row is scanned out later in the frame time such that the LCs corresponding to the last row of pixels finish their transition closer to the end of the allocated LC state change time budget (i.e., closer to time $t_e$). As shown in FIG. 4B, the BLU illumination begins before all LCs corresponding to the last row of pixels have completed their transitions (i.e., at time ti) thereby resulting in some compromised pixels. The data scan out and LC state change for all other rows of pixels occurs at times that are in between the use cases described for the first row (i.e., FIG. 4B) and the last row (i.e., FIG. 4C). Embodiments of the BDI mode are further described in U.S. Provisional Application No. 62/325,920, filed on Apr. 21, 2016, which is hereby incorporated by reference in its entirety.

Eye Tracking

Figure 5:
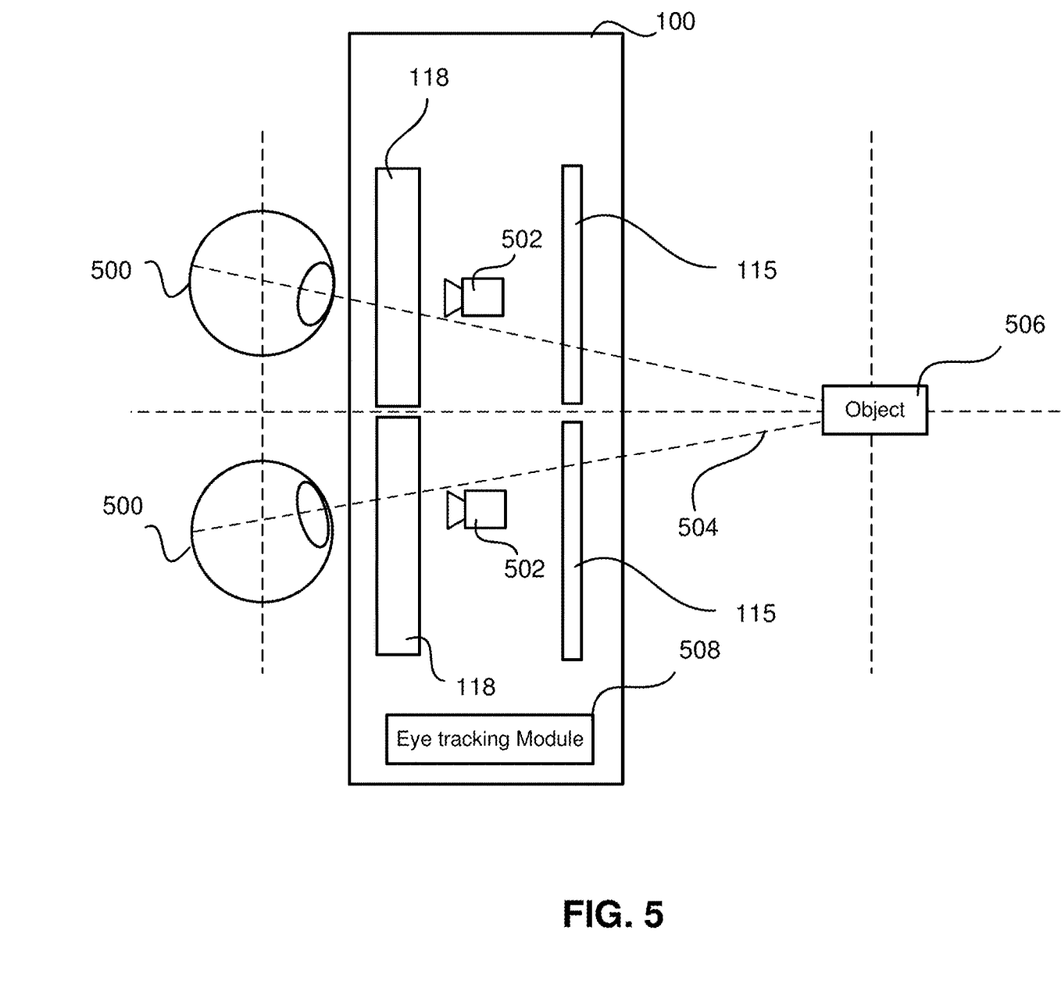
FIG. 5 shows a cross section of a headset including a camera for tracking eye position, in accordance with an embodiment.

FIG. 5 shows a cross section of a headset e.g., headset 100 or a HMD in some other system (e.g., an AR system) including a camera for tracking eye position, in accordance with at least one embodiment. The headset includes two separate cameras 502, one camera for tracking the position of each eye 500 and may include an eye tracking module 508 (e.g., eye tracking device). The eye tracking module 508 may be coupled to the two separate cameras 502 and the electronic display 115. The eye tracking module 508 may receive image data from the two separate cameras 502 and may provide information (e.g., location of an eye gaze area or illumination start time for a BLU) to the electronic display 115. In the example shown in FIG. 5, cameras 502 capture images of the user's eyes and an eye tracking module 508 within the headset 100 determines gaze lines 504 corresponding to a location where the user is looking based on the captured images. Here, the user is looking at object 506, which may be a real object (e.g., in AR applications) or a virtual object (e.g., in VR applications).

In one embodiment, the eye tracking module 508 performs eye tracking by focusing a camera on one or both of the user's eyes and records their movements as the user looks at some kind of stimulus. The stimulus can be light sources that emit light in either infrared, near-infrared, visible light, or some combination thereof. The eye tracking module 508 tracks the center of the eye's pupil by capturing eye images at a rate of, for example, 60-300 times per second, and inferring the pupil location from the images using a computer algorithm. The eye tracking module 508 estimates an intersection of gaze lines 404 corresponding to each of the user's eyes by extrapolating the gaze lines 504 until they both intersect. The eye tracking module 508 may use any of the known techniques in the art for determining the user's gaze direction for each of the user's eyes. Embodiments of the eye tracking module 508 are further described in U.S. patent application Ser. No. 14/946,143, filed on Nov. 19, 2015, and U.S. Provisional Patent Application No. 62/306,758, filed on Mar. 11, 2016, which are hereby incorporated by reference in its entirety.

Backlight Modulation Using Eye Tracking

Figure 6A:
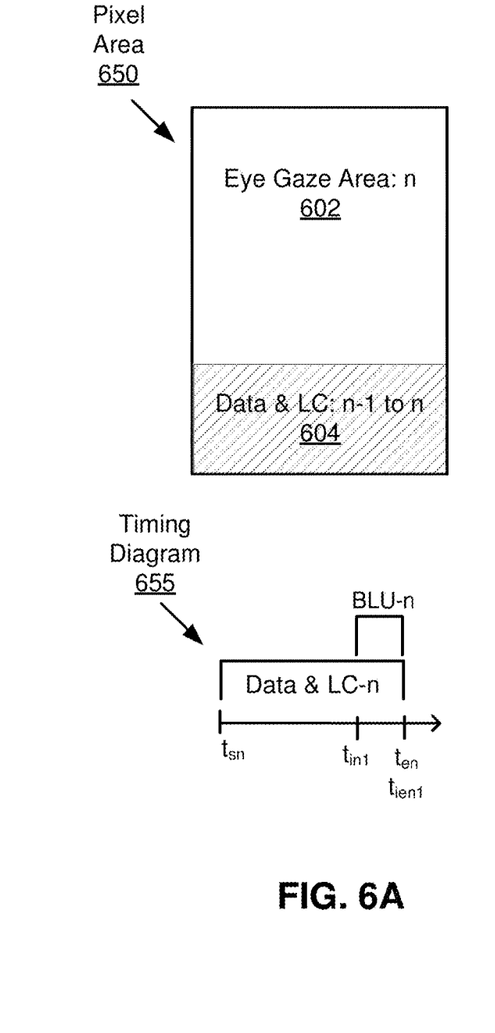
FIGS. 6A, 6B, and 6C show diagrams illustrating illumination of a backlight unit (BLU) for displaying image data on an LCD and their corresponding timing waveforms, in accordance with an embodiment.
Figure 6B:
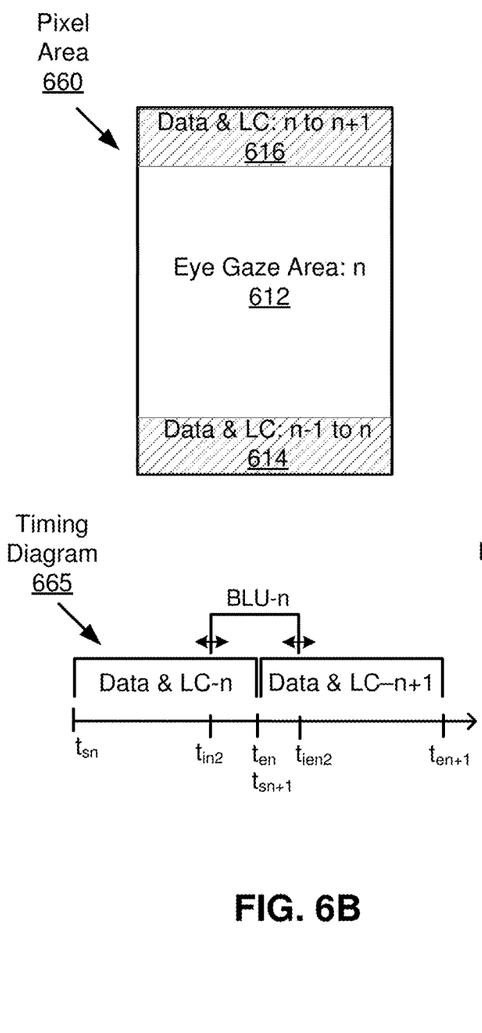
Figure 6C:
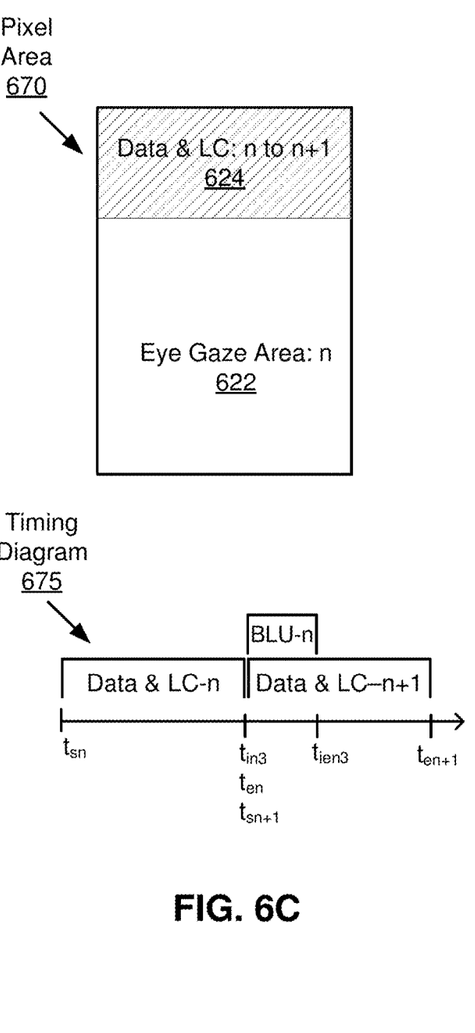

FIGS. 6A-6C show diagrams illustrating BLU illumination for displaying image data on an LCD and their corresponding timing diagrams, in accordance with an embodiment. The device system (e.g., system environment 100) utilizes eye tracking to determine a user's gaze while the user is viewing displayed image data on LCD as described above with reference to FIG. 5. The embodiment depicted in FIGS. 6A-6C displays image data using the BDI mode. As described above with reference to FIG. 4A-4C, the BLU is turned on for only a portion of the frame time in the BDI mode to display the entire pixels of the LCD. Conventionally, the BLU is turned on during the final portion of the frame, for example during the last 20% of the frame, and pixels corresponding to the bottom half of the LCD may either be in a compromised state or may display old image data from a previous frame. By using eye tracking, the BLU may be turned on at a time when the LCs corresponding to the pixels in the user's gaze of the current frame (e.g., frame n) have fully transitioned to their final state. Such modulation of the BLU using eye tracking may improve user experience by reducing the number of pixels either in a compromised state or displaying old image data from a previous frame.

FIG. 6A depicts an example use case where the user is looking at the top portion of the LCD. The top portion of FIG. 6A shows pixel area 650 of the LCD and the bottom portion shows a timing diagram 655. Pixel area 650 indicates that the user is currently looking at the top portion of the LCD represented by eye gaze area 602. The timing diagram 655 shows the period for data scan out and LC state change represented from $t_{sn}$ to $t_{en}$, where $t_{sn}$ represents the start time of the frame n and $t_{en}$ represents the end time of the frame n. The BLU illumination begins at tin' and ends at $t_{ien1}$. In one embodiment, $t_{ien1}$ may occur at the end time of frame n. The illumination of the BLU is set towards the last portion of the frame time of frame n such that the LCs corresponding to the pixels the user is looking at (i.e., eye gaze area 602) have completed their transition to their final state by the time the BLU illumination begins at tin'. Pixel area 650 shows region 604 that corresponds to the portion of the LCD whose corresponding LCs might not have completed their transitioning at the time tin'. When BLU is illuminated within frame n, some pixels of the region 604 show image data corresponding to the frame n−1 that is immediately prior to frame n and the other pixels show image data corresponding to the current frame n. However, this may not have adverse effect on the user experience because the eye gaze area is toward region 602 and not region 604.

FIG. 6B depicts an example use case where the user is looking at the middle portion of the LCD. Pixel area 660 indicates that the user is currently looking at the middle portion of the LCD represented by eye gaze area 612. The timing diagram 665 shows the period for data scan out and LC state change represented from $t_{sn}$ to $t_{en}$ for frame n and from $t_{sn+1}$ to $t_{en+1}$ for the immediately next frame n+1. The illumination of the BLU is set towards the last portion of the frame time of frame n and the first portion of frame time of frame n+1 such that the LCs corresponding to the pixels of the middle portion of the LCD (i.e., eye gaze area 612 that the user is looking at) have completed their transition to their final state by the time the BLU illumination begins at $t_{in2}$. The BLU illumination begins at $t_{in2}$ and ends at $t_{ien2}$, where $t_{ien2}$ is a time within the frame time of the immediately next frame, n+1. In comparison to the example shown in FIG. 6A, $t_{in2}$ occurs later in the frame time than $t_{in1}$. The BLU illumination time period (i.e., from $t_{in2}$ to $t_{ien2}$) may be varied based on the tracking the user eye gaze. For example, if the user's gaze moves a few rows below from the gaze shown in FIG. 6B, the BLU illumination time period is shifted to the right (i.e., delayed) to account for the change in the user's gaze. On the other hand, if the user's gaze moves a few rows above from the gaze shown in FIG. 6B, the BLU illumination time period is shifted to the left (i.e., moved to occur earlier) to account for the change in the user's gaze. Pixel area 660 shows regions 614 and 616 that corresponds to the portions of the LCD whose corresponding LCs might not have completed their state transition at the time $t_{in2}$. When BLU is illuminated within frame n, some pixels of the region 614 show image data corresponding to the frame n−1 that is immediately prior to frame n and some pixels of the region 616 show image data corresponding to the frame n+1 that is immediately after frame n. However, this may not have adverse effect on the user experience because the eye gaze area is toward region 612 and not regions 614, 616.

FIG. 6C depicts an example use case where the user is looking at the bottom portion of the LCD. Pixel area 670 indicates that the user is currently looking at the bottom portion of the LCD represented by eye gaze area 622. The timing diagram 675 shows the period for data scan out and LC state change represented from $t_{sn}$ to $t_{en}$ for frame n and from $t_{sn+1}$ to $t_{en+1}$ for the immediately next frame n+1. The BLU illumination begins at $t_{in3}$ and ends at $t_{ien3}$. In comparison to the example shown in FIG. 6B, $t_{in3}$ occurs later in the frame time than $t_{in2}$. The illumination of the BLU for frame n is set within the beginning portion of the frame time corresponding to frame n+1 such that the LCs corresponding to the pixels of the bottom portion of the LCD (i.e., eye gaze area 622 that the user is looking at) have completed their transition to their final state by the time the BLU illumination begins at $t_{in3}$. Pixel area 670 shows region 624 that corresponds to the top portion of the LCD whose corresponding LCs might not have completed their transitioning at the time $t_{in3}$. When BLU is illuminated within frame n, some pixels of the region 624 show image data corresponding to the frame n+1 that is immediately next to frame n and the other pixels show image data corresponding to the current frame n. However, this may not have adverse effect on the user experience because the eye gaze area is toward region 622 and not region 624.

While modulating BLU based on the user's eye tracking in the BDI mode might result in some compromised pixels or some amount of old image data corresponding to immediately prior frame n−1 (or new data corresponding to immediately next frame n+1), some amount of such compromised image data is acceptable as human eyes might not perceive such difference. In addition, BLU modulation ensures that the portion of the LCD the user is viewing corresponds to the portion whose LCs have more fully transitioned to their final states and thereby confining the portion of the LCD displaying compromised image data to the user's peripheral vision. In some embodiments, the VR Engine 155 may make slight adjustments in the latency correction based on the BLU timing changes relative to the frame.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head mounted display system comprising:
   a display device including:
      a display;
      a data driver configured to write data corresponding to an image to the display; and
      a controller configured to apply a first control signal to the data driver to write the data to the display and a second control signal to the display to cause illumination of at least a portion of the display during an illumination period of a frame period from an illumination start time and to cause at least a portion of the display to not be illuminated for a remaining portion of the frame period; and
   an eyetracking device configured to determine an eye gaze area of a user in an area of the display device, wherein the illumination start time varies based on a location of the eye gaze area such that the illumination start time is offset from a beginning of the frame period by a first amount and another illumination start time is offset from a beginning of another frame period by a second amount that varies, from the first amount, based on the location of the eye gaze area.

2. The head mounted display system of claim 1, wherein when the eye gaze area of the user is in a top portion of the area of the display device, the illumination start time occurs before an end of the frame period.

3. The head mounted display system of claim 1, wherein when the eye gaze area of the user is in a bottom portion of the area of the display device, the illumination start time is at an end of the frame period or a beginning of a subsequent frame period.

4. The head mounted display system of claim 1, wherein the data driver writes the data to the display corresponding to an area outside the eye gaze area in a subsequent frame period during at least a portion of the illumination period.

5. The head mounted display system of claim 1, wherein the data driver writes the data to the display at a beginning portion of the frame period, and the illumination start time occurs at or after an end of the beginning portion of the frame period.

6. The head mounted display system of claim 1, wherein when the eye gaze area of the user is in a middle portion of the area of the display device, the illumination start time occurs before an end of the frame period and the illumination period extends into a subsequent frame period subsequent to said frame period.

7. The head mounted display system of claim 6, wherein responsive to the eye gaze area of the user moving below a previous eye gaze area of the user, the illumination start time shifts closer to an end of the frame period.

8. The head mounted display system of claim 6, wherein responsive to the eye gaze area of the user moving above a previous eye gaze area of the user, the illumination start time shifts closer to a start of the frame period.

9. A method of displaying an image by a display device, the method comprising:
    writing, by a data driver, data corresponding to the image to a display;
    determining, by an eyetracking device, an eye gaze area of a user in an area of the display device;
    causing illumination of at least a portion of the display during an illumination period of a frame from an illumination start time; and
    causing at least the portion of the display to not be illuminated for a remaining portion of the frame period, wherein the illumination start time varies based on a location of the eye gaze area such that the illumination start time is offset from a beginning of the frame period by a first amount and another illumination start time is offset from a beginning of another frame period by a second amount that varies, from the first amount, based on the location of the eye gaze area.

10. The method of claim 9, wherein when the eye gaze area of the user is in a top portion of the area of the display device, the illumination start time occurs before an end of the frame period.

11. The method of claim 9, wherein when the eye gaze area of the user is in a bottom portion of the area of the display device, the illumination start time is at an end of the frame period or a beginning of a subsequent frame period.

12. The method of claim 9, further comprises:
    writing, by the data driver, the data to the display corresponding to an area outside the eye gaze area in a subsequent frame period during at least a portion of the illumination period.

13. The method of claim 9, wherein the data driver writes the data to the display at a beginning portion of the frame period, and the illumination start time occurs at or after an end of the beginning portion of the frame period.

14. The method of claim 9, wherein when the eye gaze area of the user is in a middle portion of the area of the display device, the illumination start time occurs before an end of the frame period such that the illumination period extends into a subsequent frame period subsequent to said frame period.

15. The method of claim 14, wherein responsive to the eye gaze area of the user moving below a previous eye gaze area of the user, the illumination start time shifts closer to an end of the frame period.

16. The method of claim 14, wherein responsive to the eye gaze area of the user moving above a previous eye gaze area of the user, the illumination start time shifts closer to a start of the frame period.

17. A non-transitory computer-readable storage medium comprising computer program instructions that when executed by one or more processors perform steps to:
    write, by a data driver, data corresponding to an image to a display of a display device;
    determine, by an eyetracking device, an eye gaze area of a user in an area of the display device;
    cause illumination of at least a portion of the display during an illumination period of a frame from an illumination start time; and
    cause at least the portion of the display to not be illuminated for a remaining portion of the frame period, wherein the illumination start time varies based on a location of the eye gaze area such that the illumination start time is offset from a beginning of the frame period by a first amount and another illumination start time is offset from a beginning of another frame period by a second amount that varies, from the first amount, based on the location of the eye gaze area.

18. The non-transitory computer-readable storage medium of claim 17, wherein when the eye gaze area of the user is in a top portion of the area of the display device, the illumination start time occurs before an end of the frame period.

19. The non-transitory computer-readable storage medium of claim 17, wherein when the eye gaze area of the user is in a middle portion of the area of the display device, the illumination start time occurs before an end of the frame period such that the illumination period extends into a subsequent frame period subsequent to said frame period.

20. The non-transitory computer-readable storage medium of claim 17, wherein when the eye gaze area of the user is in a bottom portion of the area of the display device, the illumination start time is at an end of the frame period or a beginning of a subsequent frame period.

* * * * *